United States Patent
Harchol et al.

(10) Patent No.: US 9,949,439 B2
(45) Date of Patent: Apr. 24, 2018

(54) HINGED COVERING FOR ADHESIVE SURFACE

(71) Applicant: Tama Plastic Industry, Kibbutz Mishmar Ha'Emek (IL)

(72) Inventors: Itamar Harchol, Kibbutz Mishmar Ha'Emek (IL); Tsafrir Lior, Kibbutz Mishmar Ha'Emek (IL); Yori Costa, Kibbutz Mishmar Ha'Emek (IL); Matan Inbar, Kibbutz Mishmar Ha'Emek (IL)

(73) Assignee: Tama Plastic Industry (IL)

( * ) Notice: Subject to any disclaimer, the term of this patent is extended or adjusted under 35 U.S.C. 154(b) by 953 days.

(21) Appl. No.: 13/906,772

(22) Filed: May 31, 2013

(65) Prior Publication Data

US 2014/0352263 A1    Dec. 4, 2014

(51) Int. Cl.
  *A01F 15/07*   (2006.01)
  *B65B 25/02*   (2006.01)
  (Continued)

(52) U.S. Cl.
  CPC ........ *A01F 15/071* (2013.01); *A01F 15/0715* (2013.01); *B65B 25/02* (2013.01);
  (Continued)

(58) Field of Classification Search
  CPC .......... B65D 65/14; B65D 75/20; B65D 5/02; B65D 5/14; B32B 7/06; B32B 3/02;
  (Continued)

(56) References Cited

U.S. PATENT DOCUMENTS 1,960,137 A * 5/1934 Brown .................. E04B 1/6812
                                                          2/338
2,170,147 A * 8/1939 Lane ...................... B65D 73/02
                                                          206/447

(Continued)

FOREIGN PATENT DOCUMENTS

CN          1972847 A       5/2007
CN        102015459 A       4/2011
          (Continued)

OTHER PUBLICATIONS

Austrian Search Report for Application No. 2013/13079 dated Dec. 9, 2014.
U.S. Appl. No. 13/734,428, filed Jan. 4, 2013.

*Primary Examiner* — Hemant M Desai
*Assistant Examiner* — Eduardo R Ferrero
(74) *Attorney, Agent, or Firm* — Lerner, David, Littenberg, Krumholz & Mentlik, LLP

(57) ABSTRACT

A wrapping material is provided comprising a plurality of wrapping units, each said wrapping unit having a leading edge at one of thereof and a tail edge at an opposing edge thereof, where each one of said plurality of wrapping units is serially connected to at least one other of said plurality of wrapping units at the corresponding leading edge, tail edge, or both. In a further embodiment, discrete adhesive areas are disposed on the first surface of said plurality of wrapping units. In a still further embodiment, the discrete adhesive areas are covered by a protective cover, wherein the protective cover is attached to the first surface of the next said serially connected wrapping unit.

15 Claims, 8 Drawing Sheets

(51) Int. Cl.
*B32B 3/06* (2006.01)
*B32B 25/08* (2006.01)
*B32B 3/08* (2006.01)
*B65D 65/14* (2006.01)
*B32B 3/04* (2006.01)
*B32B 27/08* (2006.01)
*B32B 3/02* (2006.01)

(52) U.S. Cl.
CPC ......... *A01F 2015/0745* (2013.01); *B32B 3/02* (2013.01); *B32B 3/04* (2013.01); *B32B 3/06* (2013.01); *B32B 3/08* (2013.01); *B32B 25/08* (2013.01); *B32B 27/08* (2013.01); *B65D 65/14* (2013.01); *Y10T 428/15* (2015.01); *Y10T 428/192* (2015.01)

(58) Field of Classification Search
CPC .... B32B 3/04; B32B 3/06; B32B 3/08; B32B 25/08; B32B 27/08; B32B 2307/582; Y10T 428/14; Y10T 428/15; A01F 2015/0745; A01F 15/071; A01F 15/0745; B65B 11/48; B65B 11/56; B65B 25/02; B65H 2701/19404; B23B 3/04
USPC ...... 53/466, 462; 493/264; 428/43, 58, 40.1, 428/41.8, 41.7; 229/87.01
See application file for complete search history.

(56) References Cited

U.S. PATENT DOCUMENTS

| | | | | | |
|---|---|---|---|---|---|
| 4,538,740 | A | * | 9/1985 | Petersen, Jr. | B65D 55/0854 215/246 |
| 4,562,102 | A | * | 12/1985 | Rabuse | C09J 7/02 156/90 |
| 4,622,252 | A | * | 11/1986 | Strobeck | B32B 11/04 428/88 |
| 4,826,551 | A | | 5/1989 | Ingram | |
| 4,919,272 | A | * | 4/1990 | Kai | B26F 1/20 206/484 |
| 4,933,043 | A | * | 6/1990 | Instance | B31D 1/021 156/248 |
| 5,069,969 | A | * | 12/1991 | McClintock | F16L 59/022 138/157 |
| 5,324,078 | A | * | 6/1994 | Bane | G09F 3/10 281/2 |
| 5,408,803 | A | * | 4/1995 | Weder | A01G 5/04 53/399 |
| 5,419,241 | A | | 5/1995 | Seymour et al. | |
| 5,419,253 | A | | 5/1995 | Campbell | |
| 5,591,521 | A | * | 1/1997 | Arakawa | A61F 13/493 428/352 |
| 5,595,045 | A | * | 1/1997 | Weder | A01G 5/04 53/397 |
| 5,623,812 | A | | 4/1997 | Todt | |
| 5,639,529 | A | * | 6/1997 | Gozdecki | G09F 3/10 40/306 |
| 5,707,703 | A | * | 1/1998 | Rothrum | A61M 25/02 128/849 |
| 5,707,713 | A | * | 1/1998 | Langan | G09F 3/10 283/81 |
| 5,712,021 | A | * | 1/1998 | Hernandez | B32B 1/08 156/152 |
| 5,736,211 | A | * | 4/1998 | Fontanilla | B32B 7/12 138/140 |
| 5,792,297 | A | * | 8/1998 | Hunter | B42F 13/00 156/211 |
| 5,800,893 | A | * | 9/1998 | Harden | G09F 3/0288 283/101 |
| 5,807,224 | A | * | 9/1998 | Weder | A01G 5/04 283/114 |
| 5,871,828 | A | * | 2/1999 | Volkert | B42D 15/008 40/539 |
| 5,930,981 | A | * | 8/1999 | Weder | B44C 5/06 53/399 |
| 6,001,209 | A | * | 12/1999 | Popat | B42D 5/003 156/249 |
| 6,124,522 | A | * | 9/2000 | Schroeder | A61F 15/001 206/440 |
| 6,177,163 | B1 | * | 1/2001 | Blok | G09F 3/10 156/268 |
| 6,210,768 | B1 | | 4/2001 | Blok et al. | |
| 6,347,703 | B1 | * | 2/2002 | Betts | B65D 65/14 206/457 |
| 6,495,228 | B1 | | 12/2002 | Mauch et al. | |
| 6,506,466 | B1 | * | 1/2003 | Sieber | C09J 7/0264 428/194 |
| 6,644,498 | B1 | | 11/2003 | Lemberger et al. | |
| 6,787,209 | B2 | | 9/2004 | Mass et al. | |
| 6,842,934 | B1 | | 1/2005 | McKay, Jr. et al. | |
| 7,086,627 | B2 | * | 8/2006 | Kehler | B65H 19/102 156/304.1 |
| 7,093,406 | B2 | | 8/2006 | Anstey et al. | |
| 7,093,407 | B2 | | 8/2006 | Anstey et al. | |
| 7,329,449 | B2 | * | 2/2008 | Wiklof | B41J 3/4075 283/81 |
| 7,541,080 | B2 | | 6/2009 | Mass et al. | |
| 7,636,987 | B2 | | 12/2009 | Derscheid et al. | |
| 7,722,011 | B1 | | 5/2010 | Edwards | |
| 7,954,633 | B2 | | 6/2011 | Anstey et al. | |
| 8,071,196 | B2 | | 12/2011 | Goering | |
| 8,080,300 | B2 | * | 12/2011 | Glenna | B65H 18/00 206/389 |
| 2001/0052386 | A1 | * | 12/2001 | Treleaven | B31D 1/021 156/248 |
| 2002/0086127 | A1 | * | 7/2002 | Hodsdon | B32B 7/06 428/40.1 |
| 2003/0012913 | A1 | * | 1/2003 | Seidl | G09F 3/02 428/42.3 |
| 2003/0211271 | A1 | * | 11/2003 | Cyr | B65H 19/102 428/40.1 |
| 2004/0112013 | A1 | | 6/2004 | Sloot | |
| 2006/0115616 | A1 | * | 6/2006 | Baecker | B32B 1/08 428/40.1 |
| 2007/0048482 | A1 | * | 3/2007 | Kadlec | B32B 3/04 428/40.1 |
| 2007/0134489 | A1 | * | 6/2007 | Neugebauer | A61F 13/15756 428/343 |
| 2008/0138556 | A1 | * | 6/2008 | Emmert | B32B 7/06 428/41.8 |
| 2009/0208709 | A1 | * | 8/2009 | Seta | B29C 63/0013 428/195.1 |
| 2009/0274881 | A1 | | 11/2009 | Mass | |
| 2010/0086719 | A1 | * | 4/2010 | Deiss | E04B 1/6812 428/40.1 |
| 2012/0268837 | A1 | * | 10/2012 | Rittenburg | G02B 3/08 359/742 |
| 2013/0221078 | A1 | * | 8/2013 | Skelton | B65D 65/14 229/87.01 |

FOREIGN PATENT DOCUMENTS

| | | |
|---|---|---|
| DE | 19833554 | 1/1999 |
| EP | 0535532 A2 | 4/1993 |
| WO | 2007063351 A2 | 6/2007 |

\* cited by examiner

HINGED COVERING FOR ADHESIVE SURFACE

FIELD OF THE INVENTION

The present invention relates to a variety of wrapping materials, and in particular to wrapping materials including discrete adhesive areas.

BACKGROUND OF THE INVENTION

Baling agricultural produce is a well-known and frequently used practice throughout the world. Various methods, techniques, products, materials, and equipment have been used to harvest, bale and wrap agricultural produce.

In recent years, knitted nets and films, including those constructed of polypropylene and polyethylene, have been replacing the wire/sisal twine and baling twine which have been traditionally used. However, regardless of the material being used, the wrapping material must maintain the bale within the wrapping until the user opens the bale for use in its designated purpose, such as: distribution of the agricultural product in the targeted area (e.g., manger or stall); feeding and/or processing; or the like.

Wrapping materials made from plastic films provide improved protection of the wrapped produce from the forces of nature, as it is common for agricultural produce to remain wrapped in an open field for a time period that could vary from several months to more than a year before use. One such plastic film is commonly known as "sticky film," which includes plastic films that inherently cling to itself or plastic films that include an adhesive applied to the surface area of at least one side of the plastic wrap or across the entire lateral dimension.

However, there are many problems noted in the art with respect to wrapping materials with the adhesive disposed at the lateral edges and along the longitudinal length of such wrapping material. For instance, the ease and progress of the wrapping material through the baler is greatly impeded by frictional type interaction that decreases productivity and increases costs. Additionally, when the adhesive is applied on one entire side, the strength of the adhesive must be limited since the film must still be allowed to unwind during wrapping of an item.

Moreover, there are various forces exerted on the wrapping material, which cause the wrapping material, particularly the tail edge, to come loose after an item is wrapped. Shearing and peeling are examples of some of these forces exerted on wrapping material during wrapping. In addition, if the wrapping material is used outdoors, exposure to the extremes of temperature, moisture and especially wind will cause additional problems with adhesion of the tail edge of wrapping material.

Over the years, in an attempt to solve the problem of fastening the bales wrapped with such films, a number of solutions have been proposed, such as described in U.S. Pat. Nos. 6,787,209, 7,541,080, and 8,071,196, PCT Application No. PCT/IB2005/003589, and U.S. application Ser. Nos. 12/113,720 and 13/734,428, all of which are incorporated by reference as if fully set forth herein. Such proposed solutions entailed, for example, the use of adhesive at the end of the wrap, or the use of fasteners (e.g. Velcro).

Although this type of wrapping material tends to have increased adhesive qualities, especially at the tail edge of the wrapping cycle, problems have been experienced with the portions of the wrap sticking to each other. This occurs, for instance, when wrapping units are wound onto a bobbin during the manufacturing process, or otherwise organized for use during the wrapping process. In addition, after the adhesive areas are exposed but prior to wrapping, dust and other particulate matter may decrease the adhesiveness of any adhesive areas. Further, those solutions proposing the use of fasteners and other non-adhesive connectors suffer from the disadvantages of being unreliable and financially unviable.

Thus, there is clearly a need in the art for a wrapping material that achieves the benefit of having increased adhesive qualities at the tail edge of the wrapping cycle, but without suffering from the aforementioned disadvantages, including the increased difficulty during both the manufacturing and wrapping processes, and the adverse effects of dust and other particulate matter on the quality of the adhesion.

BRIEF SUMMARY OF THE INVENTION

With the foregoing in mind, the wrapping materials of the present invention provide a solution to the deficiencies of the prior art.

Generally, the present invention concerns a wrapping material and method for wrapping baled items. The wrapping materials of the present invention may be used to wrap round bales of agricultural produce although such wrapping materials can be used to wrap bales of other shapes. Such agricultural products which may be wrapped using the present invention include, for example, hay, straw, silage, or the like, though other items that are not agriculturally related may also be wrapped using the present invention. The wrapping materials of the present invention may also be used with existing wrapping equipment or balers.

The wrapping material may be any continuous wrapping material that includes a plurality of wrapping units wherein each wrapping unit comprises a base wrapping material. The base wrapping material may be a polymer based material, a netting, a film, or a combination thereof. Each wrapping unit may also be serially connected or attached to at least another wrapping unit to form a continuous wrapping material.

In accordance with an aspect of the present invention, the inventive wrapping material includes one or more discrete adhesive areas and at least one protective cover that covers and protects the adhesive area while the wrapping material is on a roll. The protective cover can be used to prevent different wrapping layers from sticking to each other during the manufacturing process and storage. The protective covering can also protect the adhesive area from dust and other particulate matter that can cause the adhesive area to lose its adhesiveness. In one embodiment, the protective cover can be folded back along a hinge and placed on the next wrapping unit, thereby increasing the functionality and structural integrity of the next wrapping unit. In an alternative embodiment, the protective cover may be removed from the wrapping material.

When the wrapping material is unwound, the protective cover is separated from and exposes the adhesive area. More specifically, the protective cover may be folded back or removed, exposing the adhesive area for sealing the item being wrapped at the completion of a wrapping cycle. Additionally, in one embodiment, the protective cover remains adhered to the continuation of the wrapping material still on the roll for the next wrapping cycle or application.

In one embodiment of the present invention, a wrapping material is provided comprising a plurality of wrapping units, each said wrapping unit having a leading edge at one edge thereof and a tail edge at an opposing edge thereof, where each one of said plurality of wrapping units is serially connected to at least one other of said plurality of wrapping units at the corresponding leading edge, tail edge, or both. In a further embodiment, an adhesive area is disposed on the first surface of said plurality of wrapping units. In a still further embodiment, the adhesive area is covered by a protective cover, wherein the protective cover is attached to the first surface of the next said serially connected wrapping unit. In a still further embodiment, the adhesive area is covered by a protective cover that may be removed from the wrapping material, thus exposing the adhesive area.

In a further embodiment of the present invention, the wrapping material is configured on a roll. The adhesive areas may have a lateral width equal to or less than the lateral width of the wrapping units. In a still further embodiment, the wrapping units are separated by perforation.

In still a further embodiment, a hinge is constructed along the lateral width of the protective cover. The hinge may include a weak seam in the covering. In a further embodiment, the hinge is located between the back edge of the protective cover and the tail edge of the next serially connected wrapping unit. In yet a further embodiment, the front edge of the protective cover extends beyond the longitudinal length of the adhesive area and may not be attached to the first surface of the wrapping unit.

In another embodiment of the present invention, a method of wrapping an agricultural bale is disclosed, the method including baling an item using a baling machine; placing an agricultural wrapping material near a stationary component, the agricultural wrapping material being comprised of serially connected wrapping units, each with an adhesive area, the adhesive area being positioned under a protective covering in a first position and having an integral hinge and further being connected to a next serially connected wrapping unit; wrapping the baled item with the wrapping material in proximity of the stationary component, such that when the tail edge of the wrapping material passes by the stationary component, the protective covering pivots to a second position against the leading edge of the next serially connected wrapping unit, thereby revealing the adhesive area; and adhering the tail edge of the wrapping unit to the wrapped bale item. In a further embodiment, the step of pivoting the hinged protective covering to the second position forms a reinforced leading edge of the next serially connected wrapping unit.

In a further embodiment of the present invention, a method of wrapping an agricultural bale is disclosed, the method including baling an item using a baling machine; placing an agricultural wrapping material near a stationary component, the agricultural wrapping material being comprised of serially connected wrapping units, each with an adhesive area, the adhesive area being positioned under a protective covering; wrapping the baled item with the wrapping material in proximity of the stationary component, such that when the tail edge of the wrapping material passes by the stationary component, the protective covering is removed from the adhesive area, both of which may be positioned at or adjacent to the tail edge, thereby revealing the adhesive area; and adhering the tail edge of the wrapping unit to the wrapped bale item.

In yet another embodiment of the present invention, a wrapping material for wrapping an agricultural bale is disclosed, comprising a plurality of serially connected wrapping units, an adhesive area disposed on each wrapping unit, and a protective cover for covering each adhesive area, wherein the protective cover is fixed to the next serially connected wrapping unit. In a further embodiment, a wrapping material for wrapping an agricultural bale comprises a plurality of serially connected wrapping units, an adhesive area disposed on each wrapping unit, and a protective cover for covering each adhesive area, wherein the protective cover may be removed from the adhesive area.

DETAILED DESCRIPTION

Figure 1A:
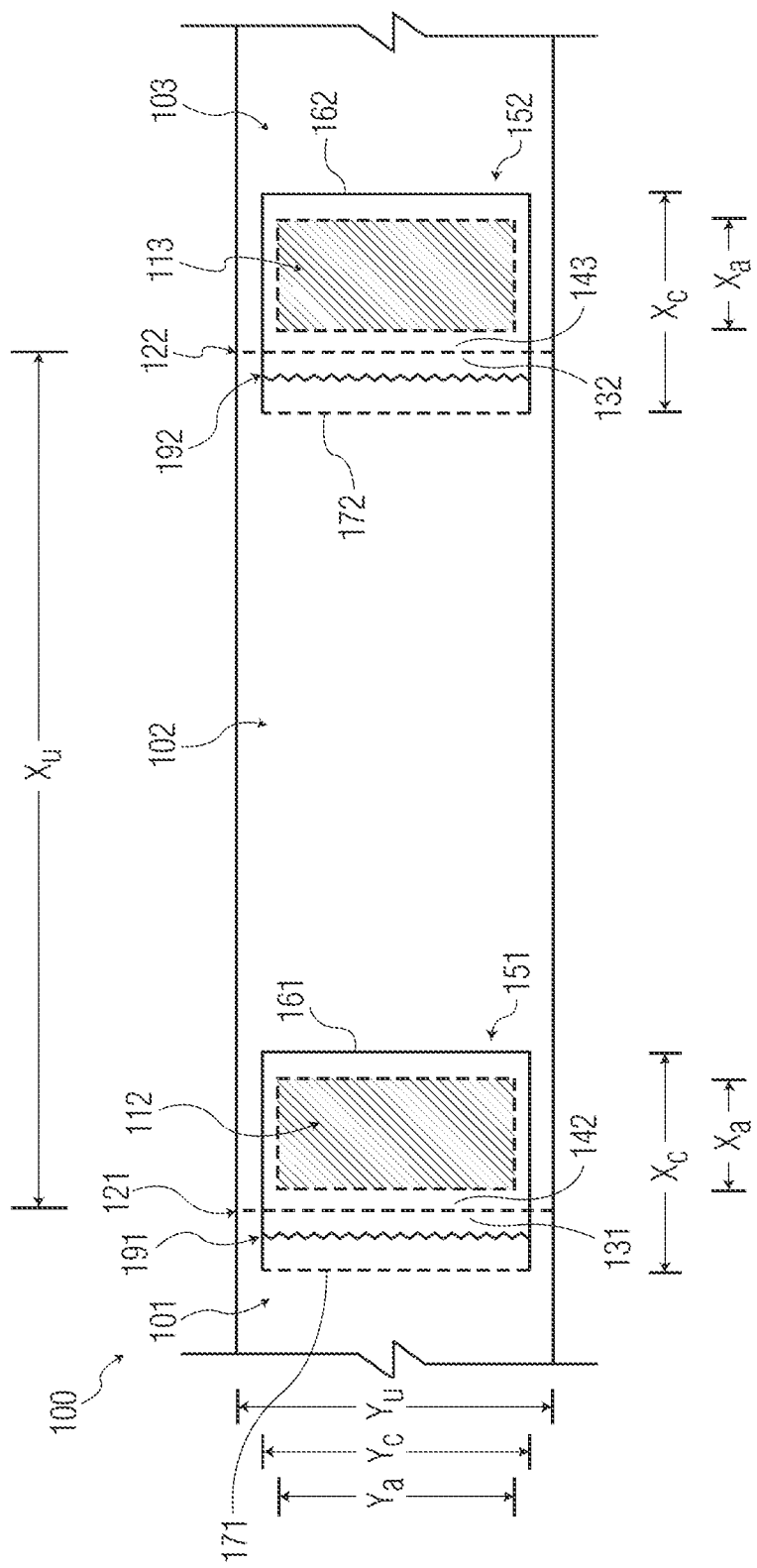
FIG. 1A is an elevated view of the wrapping material in accordance with an embodiment of the present invention.

The non-limiting embodiments and examples of the present invention will now be described with reference to FIGS. 1A-9. Like reference characters and designations throughout the figures refer to like elements.

Figure 1B:
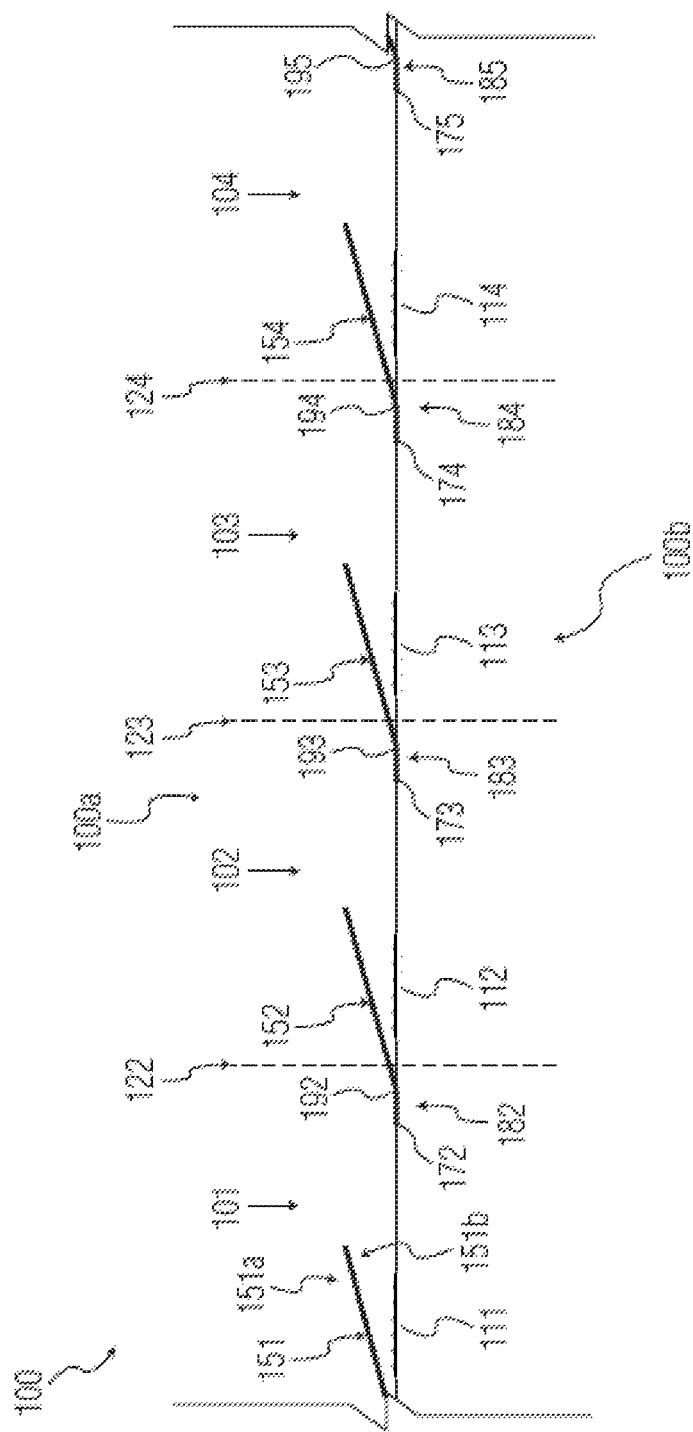
FIG. 1B is a cross-sectional view of the wrapping material of FIG. 1A.

FIG. 1A illustrates one embodiment of the present invention base wrapping material 100 including of a plurality of wrapping units 101, 102, 103 and a plurality of discrete, spaced-apart adhesive areas 112, 113. FIG. 1B shows, in cross-section, the base wrapping material 100 and the plurality of discrete adhesive areas 112, 113.

Continuing with FIGS. 1A and 1B, a plurality of serially connected wrapping units 101, 102, 103 have a first surface 100a and an opposing second surface 100b. Each wrapping unit has a lateral width Yu, a longitudinal length Xu, and terminates in a leading edge 131, 132 at one end thereof, and in a tail edge 142, 143 at the opposing edge thereof. The lateral width Yu of the wrapping material should generally be at least equal to the width of the baled item to ensure that the baled item is secured along its entire width. While the wrapping material may be wider than the width of the baled item, it is preferable that the wrapping material not be significantly thinner than the width of the baled item to ensure adequate protection of the underlying baled item by the wrapping material. The baled item may be any desired agricultural product such as, for example, hay, straw, silage, or the like. As discussed with regard to the present invention, the baled item is shaped as a round bale, such that the round bale is generally cylindrical in shape. Typically, upon collection and baling of the agricultural product, the baled item may weigh over 1,000 lbs. and commonly may weigh over 2,000 lbs. Also, such baled items have a width of several feet, commonly about 4 ft., and may be several feet tall (i.e., the diameter of the baled item), commonly 4 ft. to 6 ft.

With the exception of the first and last wrapping units of a series of connected wrapping units, the leading edge 131, 132 of each wrapping unit connects to the tail edge 142, 143 of a the next serially connected wrapping unit. Each connection point 121, 122 between a leading edge and a tail edge also comprises a separation or disconnection means that allows each wrapping unit to be separated or disconnected from the continuous roll during a wrapping cycle. To facilitate separation, each separation means comprises a cut mark, weakening, perforation, line of perforations, or the like, on, in, or through the wrapping unit. It is also possible to implement at least one mark located on or substantially on the connection point or line between the leading edges and the tail edges so as to identify the location of each separation means for use by the wrapping machine or operator for triggering a separation process that, for example, tears, cuts, or otherwise separates the leading wrapping unit from the continuous roll of wrapping material during a wrapping cycle. Such marks may form a part of the separation means or be spaced away from the separation means as might be needed by either the wrapping machine or operator to adequately perform the separation process mentioned above.

The wrapping units 101, 102, 103, may comprise netting, film, breathable film, adhesive film, a netting/film composite, or other materials suitable for wrapping that have two sides or surfaces, i.e., a first, upper, or top surface 100a, and a second, lower, or bottom surface 100b. Film, including but not limited to polymeric film, may comprise the base wrapping material, although the embodiments are not limited to the use of a film. Breathable films include films that are impermeable, for example, to liquid water, but permeable, for example, to water vapor. On this basis, a breathable film will effectively prevent external water from passing through the wrapping material and into the wrapped bale and, at the same time, allow water vapor to escape from the interior of the bale through the wrapping material.

FIGS. 1A and 1B further illustrate one embodiment of an adhesive area 112, 113 on the first surface 100a of each said wrapping unit 101, 102, 103. The wrapping material may utilize a plurality of pre-defined, discrete, spaced-apart adhesive areas disposed on a first surface of the wrapping material. Each adhesive area 112, 113 may have a lateral width Ya and a longitudinal length Xa. An adhesive area may be positioned at any location on a wrapping unit, though, as illustrated, it is preferred that the adhesive area be positioned at or adjacent to the tail edge of the wrapping unit. As discussed below, such positioning allows for closure of the tail edge upon wrapping an agricultural product with the wrapping unit.

FIGS. 1A and 1B further illustrate one embodiment of a plurality of protective covers 151, 152, protectively covering each adhesive area 112, 113. Each protective cover 151, 152 has a front edge 161, 162 and a back edge 171, 172 in addition to a first surface 151a, 152a and an opposing second surface 151b, 152b. Further, as displayed in FIG. 1A, each protective cover has a lateral width Yc and a longitudinal length Xc. As illustrated in FIG. 1A, the lateral width Ya of the adhesive areas 112, 113 may be equal or less than the lateral width Yu of the wrapping units. Also as illustrated, the longitudinal length Xa of the adhesive areas may be equal to or less than the longitudinal length Xu of the wrapping units.

Continuing with the embodiment of FIGS. 1A and 1B, the protective cover 151, 152 may be attached to the first surface 100a of the wrapping material, such that each protective cover covers an adhesive area 112, 113, but each protective cover is attached to the next serially connected wrapping unit 101, 102, 103 relative to the particular adhesive area 112, 113 covered. For example, as seen in FIG. 1B, protective cover 151 may cover adhesive area 112 disposed on wrapping unit 102, but the cover 151 may be attached to the next serially connected wrapping unit 101 at connection point 181. Similarly, protective cover 152 covers adhesive area 113 disposed on wrapping unit 103, but is attached to the next serially connected wrapping unit 102 at connection point 182. Further, in one embodiment, the front edge 161, 162 of the protective covers may not be attached to the first surface 100a of the wrapping material. In this case, only the back edges 171, 172 of the protective covers are attached to the first surface of the wrapping material at the connection points 181, 182. Also, as displayed in FIGS. 1A and 1B, the front edge 161, 162 of the protective covers 151, 152 may fully cover and extend longitudinally beyond the corresponding adhesive area 112, 113.

Further illustrated in FIGS. 1A and 1B, each protective cover 151, 152 may in some embodiments comprise an integral hinge 191, 192 which can be positioned along the lateral width Yu of the wrapping material. Preferably, the hinge 191, 192 is located in between the back edge 171, 172 of the protective cover and the tail edge 131, 132 of the next serially connected wrapping unit. The hinge 191, 192 may be formed, for example, by creating a weak seam in the protective cover 151, 152 along the lateral width of the wrapping material. As discussed further below, the hinge can allow the protective covering to pivot between, for example, a first position (in which the protective covering covers an adhesive area as illustrated in FIGS. 1A and 1B) and a second position (in which the protective covering is positioned over a portion of the wrapping material adjacent the leading edge to which it is secured, as illustrated in FIG. 2).

Figure 2:
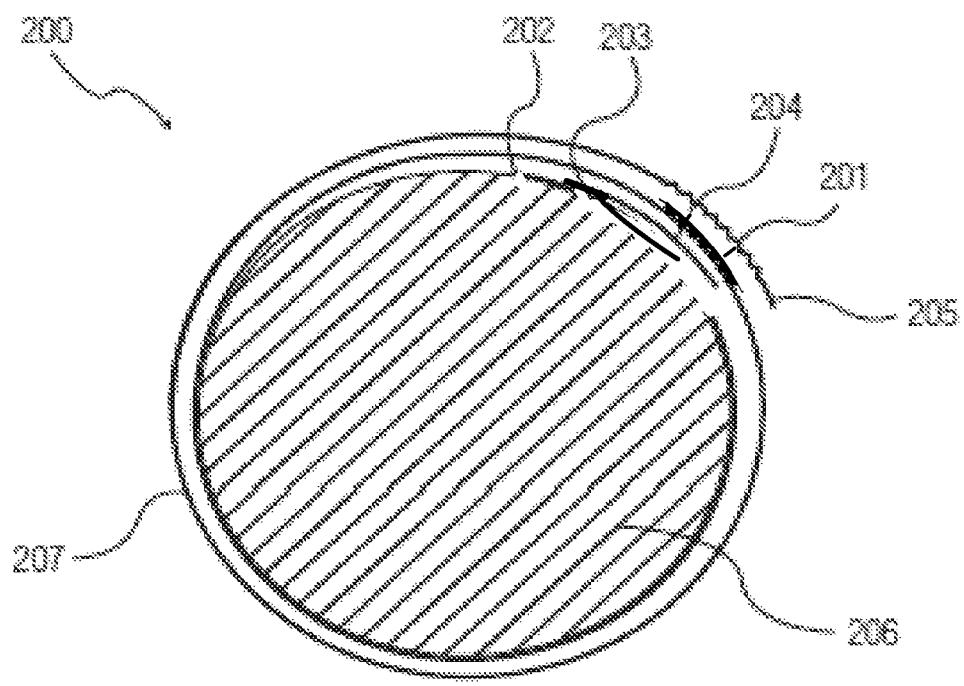
FIG. 2 is a cross-sectional view of a bale wrapped with the wrapping material in accordance with an embodiment of the present invention.

FIG. 2 shows one embodiment of a cross-sectional view of a bale wrapped with a single wrapping unit 207 of the inventive wrapping material 200. Here, a single wrapping unit 207 having a leading edge 202 and a tail edge 205 covers a round bale 206. A discrete adhesive area 201 is located approximately at the tail edge 205 on a first surface of the wrapping unit 207. In addition, a protective cover 204 is connected to the leading edge 202 of the wrapping unit 207. As illustrated, the protective cover 204 is in the second position, pivoted at the integral hinge 203 and resting against the wrapping unit 207 adjacent the leading edge 202. It is envisioned that the hinge 203 of the cover 204 may be positioned at another position relative to the leading edge 202, such as directly even with the leading edge 202, or the like. Further, it is envisioned that the wrapping unit 207 may be of any length such that the tail edge 205 (and adhesive area 201) can contact the wrapping unit 207 anywhere along its length, or further, that the wrapping unit 207 may wrap around the baled item more than once, more than twice, etc. The number of wraps a wrapping unit may be configured to make is dependent upon many characteristics such as, for example, the intended material of the baled item, the amount of material in the baled item, the length of storage, the conditions of storage, and the like. Such characteristics may determine the strength, endurance, and durability needed for a particular wrapping material.

Figure 3:
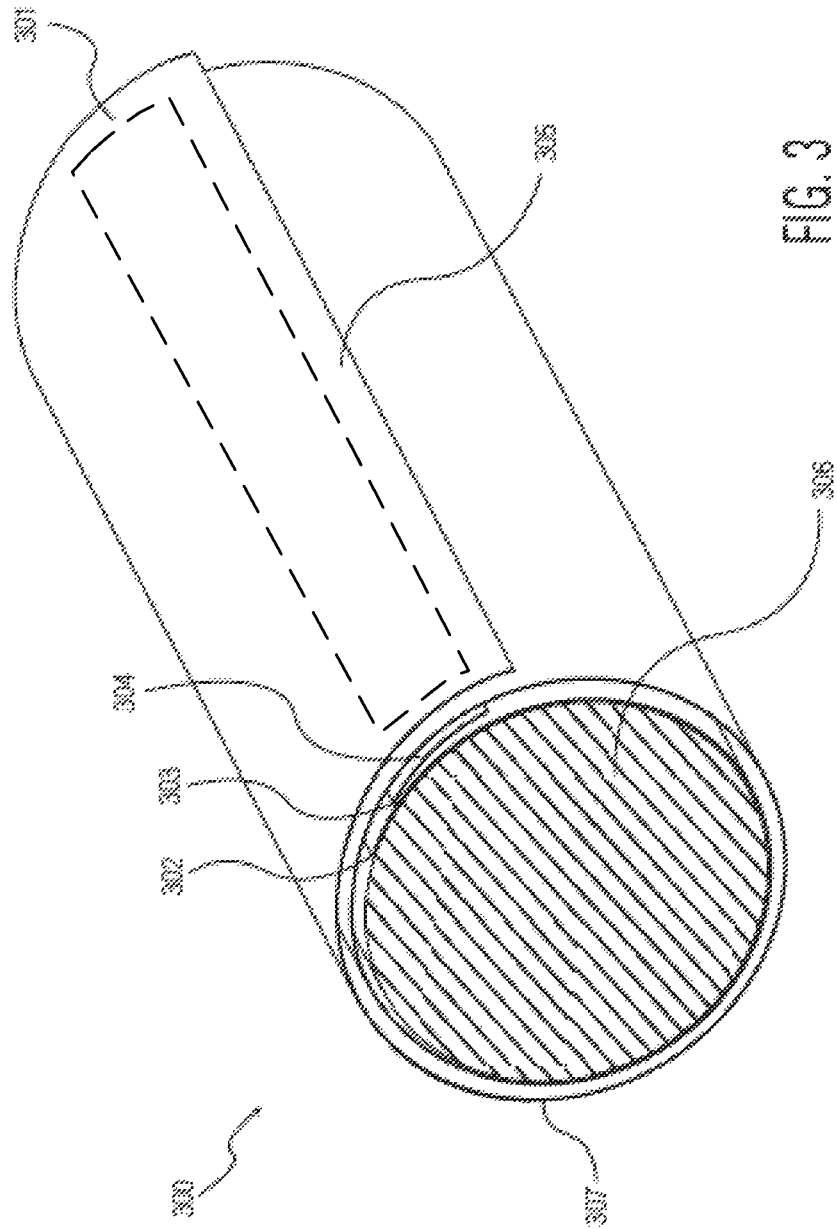
FIG. 3 is a perspective view of a bale wrapped with the wrapping material in accordance with an embodiment of the present invention.

FIG. 3 shows a perspective view of a bale wrapped with the inventive wrapping material 300 in accordance with one embodiment of the present invention. A single wrapping unit 307 having a leading edge 302 and a tail edge 305 covers a round bale 306. A discrete adhesive area 301 is located on a first surface approximately at the tail edge 305 of the wrapping unit 307. In addition, a protective cover 304 is connected to the leading edge 302 of the wrapping unit 307. As illustrated, the protective cover 304 is in a second position, pivoted at the integral hinge 303 and resting against the leading edge 302 of the wrapping unit 307. In this example, as illustrated, the wrapping unit 307 is wrapped around the baled item more than once, such that the adhesive area 301 contacts, and thus secures to, a portion of the length of the wrapping unit.

Figure 4:
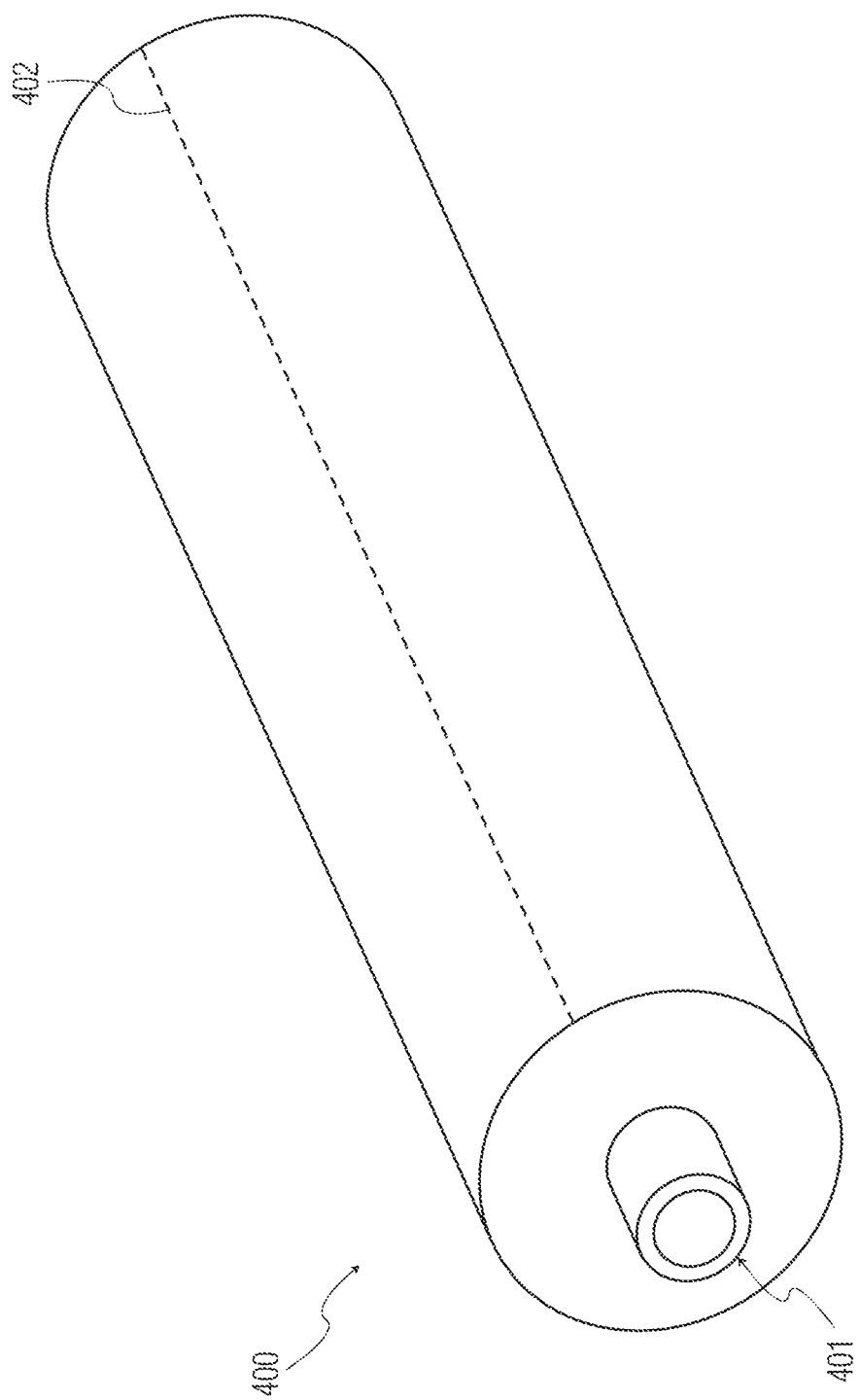
FIG. 4 is a perspective view of a roll of wrapping material in accordance with an embodiment of the present invention.

FIG. 4 shows a perspective view of a roll of wrapping material 400 in accordance with an embodiment of the present invention. During the production process of the wrapping material, the wrapping material may, preferably, be rolled onto a roll core or bobbin 401 or otherwise organized for use during the wrapping process. It is possible to roll or wind a great number of individual wraps or wrapping units on a single roll core. The width and length of each individual roll core is determined according to market requirements and the dimensions of the item or bale that needs to be wrapped. The quality of each individual wrap is a function of the wrapping material, such as the thickness of the wrap, the required length of the wrap, the maximum diameter of the roll core of wrapping material, and the desired maximum weight. The roll of wrapping material may be manufactured in an endless continuity, i.e. a continuous roll wherein the wrapping material is a continuous film and the wrapping units may be separated 402, during manufacture, by means of a cut mark, weakening, perforation, or the like between individual wraps or wrapping units. Alternatively, the wrapping units may be manufactured individually and subsequently attached or connected to form a continuous wrapping material which may then be wound on the roll core. It is also possible to implement marks along the entire length of the continuous roll of wrapping material, wherein the marks identify the beginning and ending points of each connecting wrapping unit as a required cut-off point and at least the wrapping machine or baler may cut and release a wrapping unit from the continuous roll during a wrapping cycle.

Figure 5:
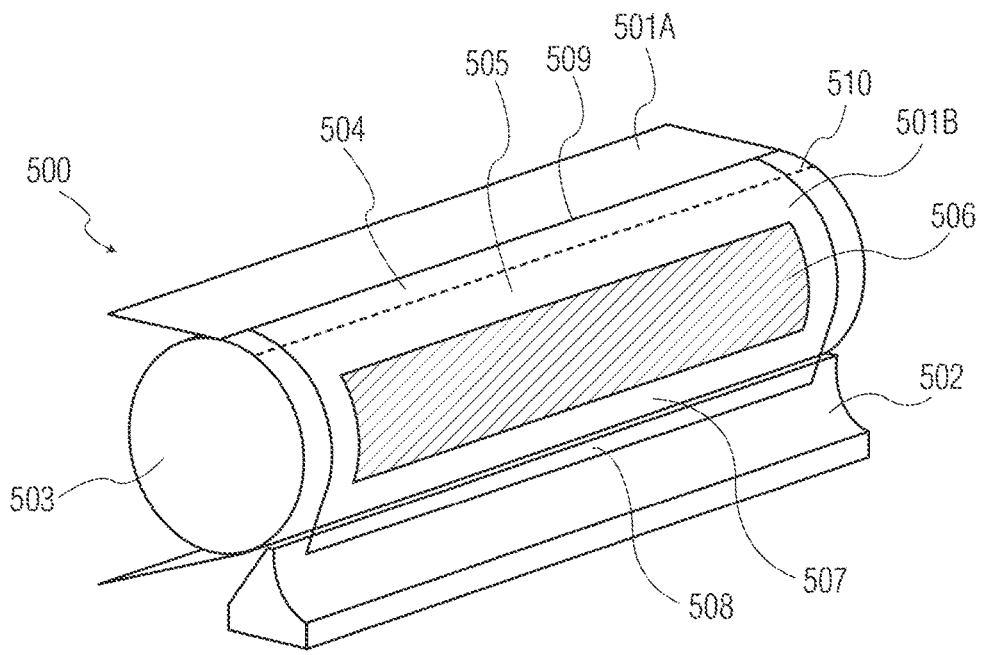
FIG. 5 is a perspective view of a method for wrapping an agricultural bale in accordance with an embodiment of the present invention.
Figure 6:
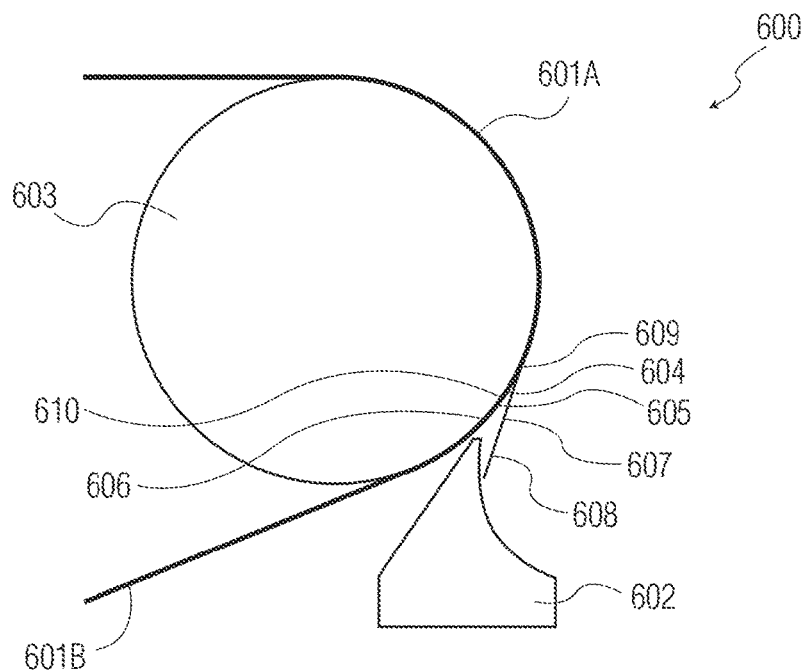
FIG. 6 is a cross-sectional view of the method for wrapping an agricultural bale illustrated in FIG. 5.

FIGS. 5-6 illustrate another embodiment of the present invention, including a system for use in a method of wrapping an agricultural bale. The system, for example, includes a length of wrapping material comprised of a plurality of wrapping units 501A, 501B (as in FIGS. 1A and 1B, for example) and a wrapping component including a roller of the applicable machinery 503 and a stationary component 502. This wrapping component may be integrated or retrofitted into a standard baling machine, as known in the art, or alternatively, may be one aspect of a novel baling machine for specific use with the wrapping material of the present invention.

In use, as in FIG. 5, one embodiment of the present invention includes a method of wrapping a baled item. In the method, a supply of the inventive wrapping material, comprised of a plurality of wrapping units 501A, 501B, is positioned within and fed through wrapper baling machine to roll 503. The roll 503 may be positioned in proximity to stationary component 502, which may include an anvil, such that the wrapping material 501A, 501B, passing around roll 503, may interact with stationary component 502, as described further below. The wrapping material is comprised of a plurality of wrapping units 501A and 501B separated by perforation 510 (as in FIGS. 1A and 1B). Consecutive wrapping units have a tail edge 505, and a following leading edge 504 of the following wrap, as discussed above. The tail edge of each wrapping unit 505 includes adhesive area 506 and a protective cover 507, which may or may not be connected to the leading edge 504 of the next serially connected wrapping unit 501A. The protective cover includes a front edge 508 and a possible integral hinge 509 over which it can pivot between a first position and second position.

Continuing with this embodiment, FIG. 6 illustrates a cross-sectional view in which the tail edge 605 of the wrapping material 601A, 601B may pass by the stationary component 602 such that the front edge 608 of the protective cover 607 contacts the stationary component. Such contact, as illustrated, may pivot the protective cover 607 from the first position (i.e., as in FIG. 5, positioned over the adhesive area) around the integral hinge 609 to the second position against the leading end 604 of the next serially connected wrapping unit. Once the protective cover is positioned in the second position or removed from the adhesive area, the tail edge 605 can be separated from the next wrapping unit (still on roll 601A) by release of the perforation 610, or the like. The wrapping unit may then continue to be rolled onto the baled item until the adhesive area 606 (now exposed) contacts and secures to the wrapping unit, thereby completing the baling process of the baled item.

Following the completion of the baled item, the wrapped baled item may be removed from the machine. Then, another item to be baled may be positioned in the machine and the leading edge, which includes protective cover 607, may be fed from roll 603 and to the baled item to initiate the wrapping of the next baled item, and the above-discussed method may be repeated. It should be noted that the protective cover 607, in this second position, provides numerous benefits to the wrap. For example, the protective cover can now serve to strengthen the leading edge of the wrap. In another example, the protective cover 607 can also provide easier feeding of the next wrap.

Figure 7:
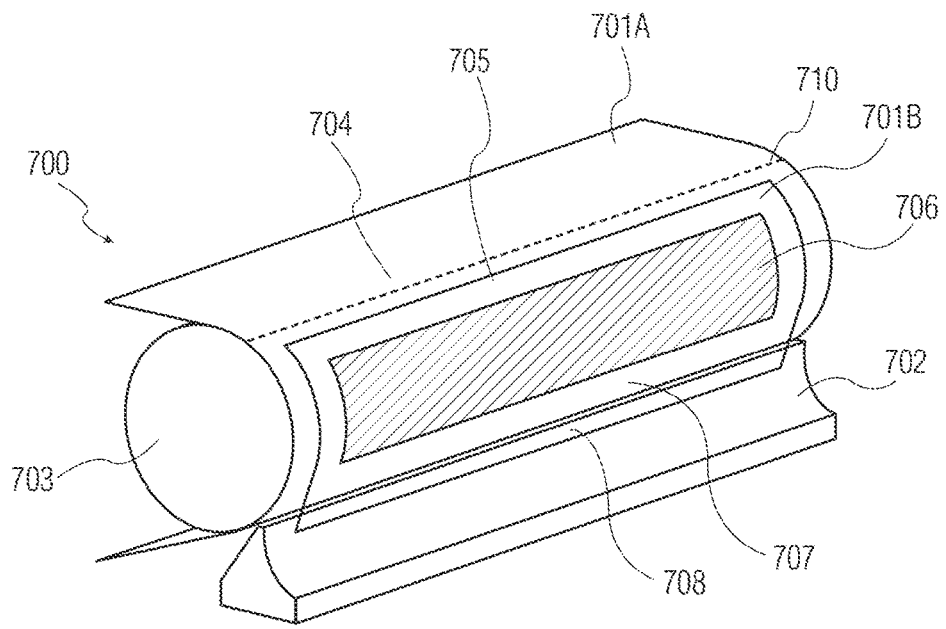
FIG. 7 is a perspective view of a method for wrapping an agricultural bale in accordance with another embodiment of the present invention.
Figure 8:
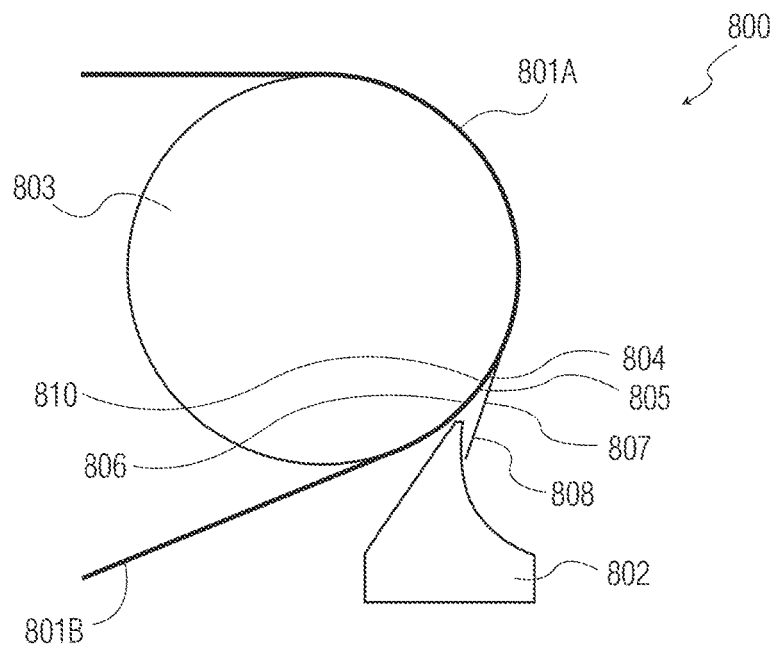
FIG. 8 is a cross-sectional view of the method for wrapping an agricultural bale as illustrated in FIG. 7.

FIGS. 7-8 illustrate another embodiment of the present invention. The system, for example, includes a length of wrapping material comprised of a plurality of wrapping units 701A, 701B (as in FIGS. 1A and 1B, for example) and a wrapping component including a roller of the applicable machinery 703 and a stationary component 702.

In use, as in FIG. 7, one embodiment of the present invention includes a method of wrapping a baled item. In the method, a supply of the inventive wrapping material, comprised of a plurality of wrapping units 701A, 701B, is positioned within and fed through wrapper baling machine to roll 703. The roll 703 may be positioned in proximity to stationary component 702, which may include an anvil, such that the wrapping material 701A, 701B, passing around roll 703, may interact with stationary component 702, as described further below. The wrapping material is comprised of a plurality of wrapping units 701A and 701B separated by perforation 710 (as in FIGS. 1A and 1B). Consecutive wrapping units have a tail edge 705, and a following leading edge 704 of the following wrap, as discussed above. The tail edge of each wrapping unit 705 includes adhesive area 706 and a protective cover 707. The protective cover includes a front edge 708. Contrary to the previous embodiments, specifically as illustrated in FIGS. 1A and 1B, the protective cover need not extend past the tail edge and to the leading edge of the next wrapping unit since, in this embodiment, no hinge is present. Thus, as illustrated, the protective cover of this embodiment may preferably only be large enough to cover at least the surface area of the adhesive area.

Continuing with this embodiment, FIG. 8 illustrates a cross-sectional view in which the tail edge 805 of the wrapping material 801A, 801B may pass by the stationary component 802 such that the front edge 808 of the protective cover 807 contacts the stationary component 802. Such contact, as illustrated, may remove the protective cover from the adhesive area. Once the protective cover is removed, the tail edge 805 can be separated from the next wrapping unit (still on roll 801A) by release of the perforation 810, or the like. The wrapping unit may then continue to be rolled onto the baled item until the adhesive area 806 (now exposed) contacts and secures to the wrapping unit, thereby completing the baling process of the baled item. The removed protective cover may then fall away from the stationary component to a collection area, may be handled and disposed of by the user, or otherwise moved away from the wrapping material. The resulting wrapped bale, from this method, may resemble that of FIGS. 2 and 3, though without the protective cover present on the wrapping unit and within the wrapped bale.

Figure 9:
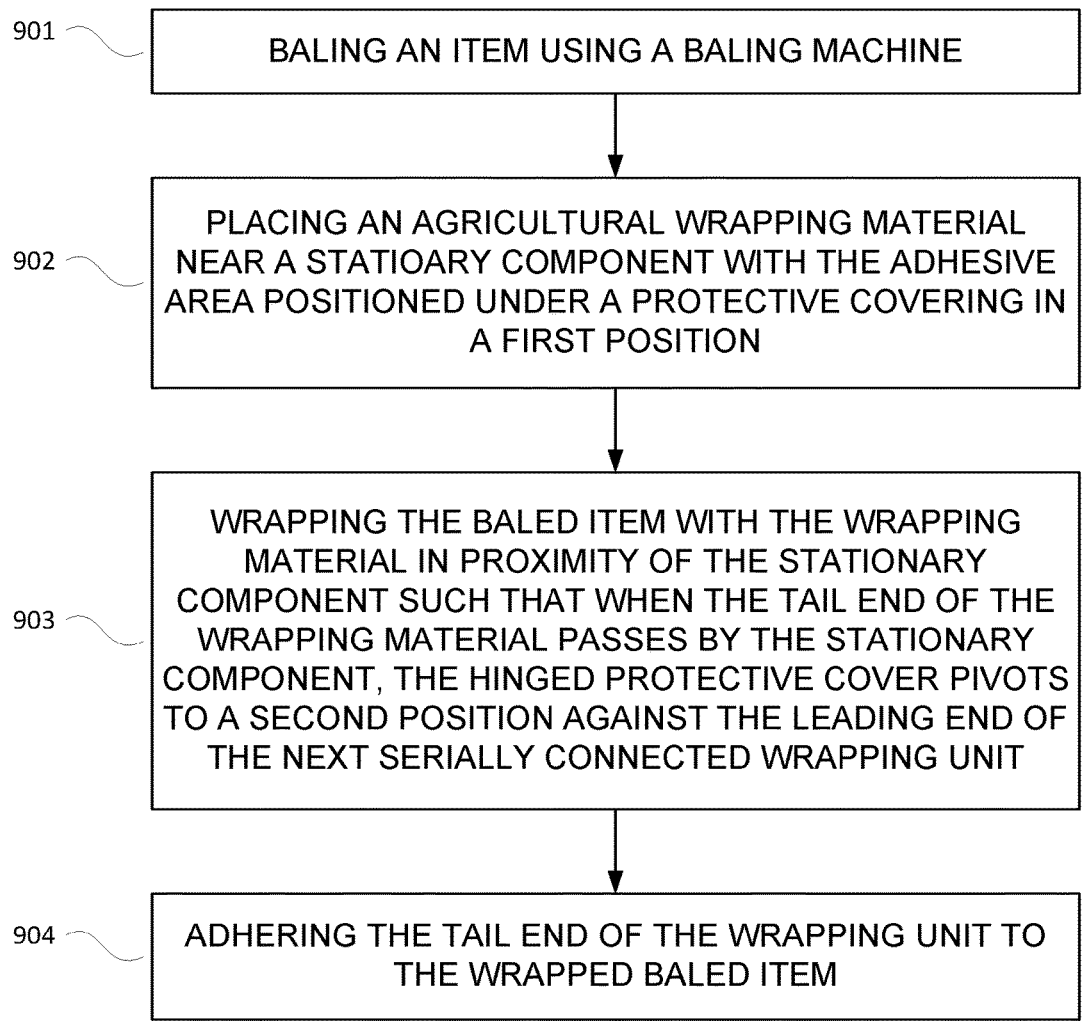
FIG. 9 is a flow-chart depicting one embodiment of a method for wrapping an agricultural bale in accordance with an embodiment of the present invention.

FIG. 9 illustrates a step-by-step flow chart 700 of a method for wrapping an agricultural bale in accordance with one embodiment of the present invention. First, an item is baled 901 using a baling machine. Next, an agricultural wrapping material is placed near a stationary component 902 with an adhesive area positioned under a protective covering in a first position. Then, the baled item is wrapped 903 with the wrapping material in proximity of the stationary component, such that when the tail end of the wrapping material passes by the stationary component, the protective cover contacts the stationary component and pivots the protective cover to a second position against the leading end of the next serially connected wrapping unit. Finally, the tail edge 904 of the wrapping unit is adhered to the wrapped baled item. However, in an alternative embodiment, the protective cover is attached to the adhesive area but not otherwise attached to the first surface of the wrapping material. In this embodiment, the baled item is wrapped with the wrapping material in proximity of the stationary component, such that when the tail end of the wrapping material passes by the stationary component, the protective cover contacts the stationary component and is removed from the adhesive area, thus exposing the adhesive area. As discussed above, the removed protective cover may then move away from the wrapping material to be disposed of, reused in manufacturing a subsequent roll of wrapping material, or the like.

It is envisioned that certain steps of the above exemplary embodiments of a method of wrapping a baled item can be performed in other ways than as disclosed. For example, in one alternative embodiment, the stationary component of the present invention may instead be a robotic arm, a manual blade, or the like, suitable for engaging and manipulating the protective cover to expose the adhesive area.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A wrapping material for wrapping around an item, the wrapping material comprising: a plurality of wrapping units, each said wrapping unit having a first surface, an opposing second surface, a lateral width along a lateral direction and a longitudinal length along a longitudinal direction, each said longitudinal length terminating in a leading edge at one end thereof and in a tail edge at an opposing edge thereof, said plurality of wrapping units being serially connected to one other in the longitudinal direction, each wrapping unit further comprising:
   a discrete adhesive area disposed on said first surface of said wrapping unit, said adhesive area having a lateral width and a longitudinal length, wherein the adhesive area is configured to secure one or more wrapping units of the wrapping material on the item by adhering to the second surface of one of the one or more wrapping units;
   a protective cover having a first surface, an opposing second surface, a front edge, a back edge, a lateral width and a longitudinal length, the opposing second surface of the protective cover being affixed to the first surface of the wrapping unit at a point that is closer to the leading edge of the wrapping unit than the adhesive area is disposed, the opposing second surface of the protective cover being positioned to removeably cover the adhesive area of a wrapping unit adjacent to the leading edge of the wrapping unit, and a hinge constructed along the lateral width of said protective cover, wherein the hinge is located between said back edge of said protective cover and said tail edge of the next said serially connected wrapping unit.

2. The wrapping material of claim 1, wherein said wrapping material is provided on a roll.

3. The wrapping material of claim 2, wherein said serially connected wrapping units are separated by a perforation.

4. The wrapping material of claim 3, wherein said lateral width of the said adhesive area is less than said lateral width of said wrapping units.

5. The wrapping material of claim 4, wherein said longitudinal length of said protective cover is less than the longitudinal length of said wrapping unit.

6. The wrapping material of claim 5, wherein said front edge of said protective cover extends beyond the longitudinal length of said adhesive area of the adjacent wrapping unit covered by the protective cover, and wherein the protective cover is not affixed to said first surface of the adjacent wrapping unit.

7. The wrapping material of claim 1, wherein the opposing second surface of the protective cover is affixed to said first surface of the wrapping unit and positioned at or adjacent to the leading edge of the wrapping unit, and wherein the adhesive area covered by the protective covered is positioned at or adjacent to the tail edge of the adjacent wrapping unit.

8. The wrapping material of claim 1, wherein the hinge includes a weak seam in the protective covering.

9. The wrapping material of claim 1, wherein the back edge of the protective cover is affixed to the first surface of the wrapping unit, and the leading edge of the protective cover is positioned to removeably cover the adhesive area.

10. A method of wrapping an agricultural bale, the method comprising:
   baling an item using a baling machine; placing an agricultural wrapping material near a stationary component, said wrapping material comprised of serially connected wrapping units, each said wrapping unit having a leading edge and a tail edge, each wrapping unit having an adhesive area positioned at or adjacent to a first surface of the tail edge, the adhesive area positioned under a protective covering with said protective covering in a first position, the protective covering having a first surface, an opposing second surface, a front edge, a back edge, a lateral width and a longitudinal length, the opposing second surface of the protective cover being affixed to the first surface of the wrapping unit at a point that is closer to the leading edge of the wrapping unit than the adhesive area is disposed, the opposing second surface of the protective cover being positioned to removeably cover the adhesive area of a next serially connected wrapped unit, the protective covering further having an integral hinge constructed along the lateral width of the protective covering and located between a back edge of the protective covering and the tail edge of the next serially connected wrapped unit, and further being connected to the next serially connected wrapped unit; wrapping the agricultural bale with said wrapping material in proximity of the stationary component, such that when the tail edge of the wrapping material passes by the stationary component, the stationary component causes the hinged protective cover to pivot to a second position against the leading end of the next serially connected wrapping unit, thereby revealing the adhesive area; and adhering the revealed adhesive area of the wrapping unit to the wrapped agricultural bale.

11. The method of claim 10, wherein said wrapping material is provided on a roll.

12. The method of claim 11, wherein said serially connected wrapping units are separated by a perforation.

13. The method of claim 10, further comprising the step of creating the integral hinge along the lateral width of said protective cover.

14. The method of claim 10, wherein the step of creating the integral hinge along the lateral width of said protective covering includes creating a weak seam in the protective covering.

15. The method of claim 10, wherein the step of pivoting of the hinged protective covering to the second position forms a reinforced leading edge of the next serially connected wrapping unit.

* * * * *

UNITED STATES PATENT AND TRADEMARK OFFICE
CERTIFICATE OF CORRECTION

PATENT NO. : 9,949,439 B2
APPLICATION NO. : 13/906772
DATED : April 24, 2018
INVENTOR(S) : Itamar Harchol et al.

Page 1 of 1

It is certified that error appears in the above-identified patent and that said Letters Patent is hereby corrected as shown below:

In the Claims

Column 12, Line 11, Claim 14, "claim 10" should read -- claim 13 --.

Signed and Sealed this
Nineteenth Day of March, 2019

Andrei Iancu
*Director of the United States Patent and Trademark Office*